United States Patent [19]

McMurtry et al.

[11] Patent Number: 5,505,005
[45] Date of Patent: Apr. 9, 1996

[54] TOUCH PROBE

[75] Inventors: David R. McMurtry, Wotton-Under-Edge; David Wilson, Stonehouse; Peter K. Hellier, North Nibley; Peter Hajdukiewicz, Wotton-Under-Edge, all of United Kingdom

[73] Assignee: Renishaw PLC, Gloucestershire, United Kingdom

[21] Appl. No.: 272,426

[22] Filed: Jul. 11, 1994

Related U.S. Application Data

[63] Continuation-in-part of Ser. No. 836,729, Feb. 19, 1992, Pat. No. 5,339,535, which is a continuation-in-part of Ser. No. 768,433, Sep. 26, 1991, abandoned.

[30] Foreign Application Priority Data

| Feb. 23, 1990 | [GB] | United Kingdom | 9004117 |
| Oct. 1, 1991 | [GB] | United Kingdom | 9120818 |
| Nov. 9, 1991 | [GB] | United Kingdom | 9123853 |

[51] Int. Cl.$^6$ .................................. G01B 5/012
[52] U.S. Cl. ................................. 33/561; 33/558
[58] Field of Search ............................ 33/556, 557, 558, 33/559, 560, 561

[56] References Cited

U.S. PATENT DOCUMENTS

| 4,084,323 | 4/1978 | McMurtry . | |
| 4,153,998 | 5/1978 | McMurtry . | |
| 4,177,568 | 12/1979 | Werner et al. . | |
| 4,187,614 | 2/1980 | Abiru et al. . | |
| 4,349,946 | 9/1982 | McMurtry . | |
| 4,462,162 | 7/1984 | McMurtry . | |
| 4,523,382 | 6/1985 | Werner et al. . | |
| 4,562,646 | 1/1986 | Dall'Aglio . | |
| 4,581,826 | 4/1986 | Ernst . | |
| 4,637,119 | 1/1987 | Schneider et al. . | |
| 4,651,405 | 3/1987 | McMurtry . | |
| 4,679,332 | 7/1987 | Lüthi . | |
| 4,688,307 | 8/1987 | Schneider et al. . | |
| 4,734,994 | 4/1988 | Cusack . | |
| 4,813,151 | 3/1989 | Hajdukiewicz et al. . | |
| 4,815,214 | 3/1989 | Enderle et al. . | |
| 4,817,362 | 4/1989 | Archer . | |
| 4,916,825 | 4/1990 | Breyer . | |
| 4,938,083 | 7/1990 | Gurny et al. . | |
| 4,972,594 | 11/1990 | Gurny et al. . | |
| 5,024,003 | 6/1991 | Breyer . | |
| 5,041,806 | 8/1991 | Enderle et al. . | |
| 5,048,194 | 9/1991 | McMurtry . | |
| 5,084,981 | 2/1992 | McMurtry et al. . | |
| 5,327,657 | 7/1994 | Hajdukiewicz et al. | 33/556 |
| 5,339,535 | 8/1994 | McMurtry et al. | 33/561 |
| 5,345,689 | 9/1994 | McMurtry et al. | 33/556 |

FOREIGN PATENT DOCUMENTS

| 0146697 | 7/1985 | European Pat. Off. . |
| 0392660 | 10/1990 | European Pat. Off. . |
| 0426492A2 | 5/1991 | European Pat. Off. . |
| 3811851A1 | 10/1989 | Germany . |
| 64-35202 | 2/1989 | Japan . |
| 1095-028-A | 5/1984 | U.S.S.R. . |
| 2101325 | 1/1983 | United Kingdom . |
| WO89/05210 | 6/1989 | WIPO . |
| WO89/05435 | 6/1989 | WIPO . |
| WO90/04149 | 4/1990 | WIPO . |

*Primary Examiner*—Thomas B. Will
*Attorney, Agent, or Firm*—Oliff & Berridge

[57] ABSTRACT

A touch probe includes a stylus module (54) and a sensing module (52) to which the stylus module is releasably securable by a magnetic coupling. The sensing module comprises a strain sensitive load cell on which the stylus module is supported, and which senses strain in the stylus on contact with a surface. The stylus module provides for overtravel of the probe; a stylus-supporting member being biased into a kinematic rest position with respect to the casing of the stylus module. The biasing force in the stylus module is chosen with regard to the length and configuration of stylus. This modular system enables automated stylus changing without the need to adjust the biasing force on the stylus-supporting member when different lengths of styli are employed.

5 Claims, 6 Drawing Sheets

TOUCH PROBE

RELATED APPLICATIONS

This is a continuation-in-part of U.S. patent application Ser. No. 07/836,729, filed on Feb. 19th, 1992, now U.S. Pat. No. 5,339,535, which is a continuation-in-part of U.S. patent application Ser. No. 07/768,433, filed on Sep. 26th, 1991, which is the U.S. National Phase of International Application PCT/GB91/00293, filed on Feb. 25th, 1991.

BACKGROUND OF THE INVENTION

1. Field of the Invention

The present invention relates to a touch probe which carries a surface contacting stylus, and is used on a coordinate positioning machine (such as a coordinate measuring machine or machine tool) to sense the position of, for example, a workpiece surface. More particularly, the invention relates to a touch probe on which a number of different styli may be interchangeably supported.

One type of known touch probe is a "touch-trigger" probe. Touch-trigger probes emit a trigger signal upon sensing contact between a stylus carried by the probe and a surface. Typically, such a probe comprises a fixed structure, such as a housing, by which the probe may be supported on the movable arm of a coordinate positioning machine, and a stylus-supporting member, to which the stylus is connectable, supported within the housing in a rest position. The stylus-supporting member may be displaced from the rest position when a deflecting force is applied to the stylus, typically as a result of contact between the sensing tip of the stylus and the surface of a part to be inspected, during movement of the movable arm, and thus the probe, relative to the surface (this is known as "overtravel"). A biasing force is provided to bias the supporting member into the rest position, so that irrespective of the orientation of the probe, upon removal of the deflecting force the supporting member returns precisely to the rest position. Such a probe is known from U.S. Pat. No. 4,153,998.

It is frequently necessary to inspect parts of a relatively complex shape, having surfaces which are oriented in a variety of directions. One way to perform such inspection is to provide a probe with a suitably shaped stylus, which has one or more sensing tips oriented in such a way that the surface of the part to be inspected my easily be contacted. In order to provide a truly flexible measuring system however, it is desirable to provide automatic changing of one or more such styli on a probe.

2. Description of Related Art

Such an automatic stylus-changing system is known from, for example, U.S. Pat. No. 4,637,119, in which an electromagnetic clamping device is provided on the stylus-supporting member to enable releasable clamping of a plurality of different styli to the stylus-supporting member.

A further type of stylus changing system is known from U.S. Pat. No. 4,349,946 and EP 343237, in which styli are releasably retained by means of a bayonet-type connection. In U.S. Pat. No. 4,349,946 the bayonet connection is provided between the stylus and stylus-supporting member, with the relative rotation required to perform an exchange operation being provided by a motor in the probe which rotates the stylus-supporting member. EP 343237 discloses a releasable bayonet connection between an entire stylus-supporting member and probe; the relative rotation for an exchange operation is generated by means of relative translational motion between the probe and a magazine containing the stylus-supporting member.

All of the above-mentioned stylus-changing systems are relatively complex. Additionally, each of these systems suffers from the problem that different lengths of styli ideally require different biasing forces (a) due to the different weights of their differing lengths and (b) to prevent overloading of short styli. Manual adjustment of the biasing force each time a stylus is changed is impractical since such a stylus changing system is ideally automated to provide flexible part inspection. Automatic adjustment mechanism for the biasing force (such as the one shown in U.S. Pat No. 5,024,003) are complex and undesirably add to the weight of the probe.

SUMMARY OF THE INVENTION

A first aspect of the present invention provides a touch probe for a coordinate positioning machine, having an elongate stylus, and means for detecting contact of said stylus with an object, wherein said probe includes a retaining module and a stylus module which is releasably and repeatably retainable on the retaining module, thereby to enable the exchange of one configuration of stylus for another, and thus the inspection of differently oriented surfaces of a part under inspection, wherein: said retaining module comprises:

- means for enabling rigid connection thereof to the movable arm of the machine:
- a first set of engagement elements for receiving the stylus module; and
- a first ferromagnetic element; and said stylus module comprises:
- a supporting structure, having a second set of engagement elements provided thereon, engageable with said first set of engagement elements, thereby to enable repeatable location of said stylus module on said retaining module;
- a second ferromagnetic element, provided on said support structure, for cooperating with said first ferromagnetic element to releasably retain said stylus module on said retaining module;
- a movable stylus supporting member for carrying said stylus, the movable member being supported relative to the support structure in a rest position, from which it may be displaced when a deflecting force is applied to the stylus, and to which it may return when said force is removed; and biasing mums for biasing the movable member into the rest position, said biasing means acting between said support structure and said movable member.

This modular approach to stylus changing is relatively simple by comparison with the prior art, the robustness of the modules enabling the magnetic connection to be broken by means of the movement of the machine.

In addition, if desired, the modular approach of the present invention enables each stylus module to have a suitably chosen biasing force for biasing the stylus-supporting member into its rest position, and thus when one stylus module is exchanged for another, the biasing force on the stylus-supporting member of each stylus module is appropriate for the length and configuration of stylus of that module.

The sensing means may be provided either in the retaining module, or the stylus module. When the sensing means is situated within the retaining module, sensing may be provided either by sensors of the strain sensing type, see e.g.

U.S. Pat. Nos. 4,813,151 or 4,177,568, or of the more conventional type such as those disclosed in e.g. U.S. Pat. No. 4,153,998. When the sensing means is provided within the stylus module, sensing will preferably be by means of conventional sensors, such as those disclosed in U.S. Pat. No. 4,153,998.

On advantage of providing the sensing means in the retaining module is that the need for any signal communication links between modules is obviated. The stylus module thus serves purely as an overtravel device substantially simplifying the construction.

In one embodiment when strain sensors are employed in the retaining module, strain (resulting from deformation of the stylus) is transmitted through the support structure of the stylus module to a strain-sensitive load cell within the retaining module. The strain-sensitive load cell is preferably relatively stiff to avoid mechanical hysteresis, and to give the correct dynamic range of response to strain without significant deflection of the load cell. In one example, the load cell comprises two structures, one of which is connected directly to the fixed structure of the retaining module, the other of which supports the stylus module, the two structures being interconnected by one or more areas of relative weakness on each of which one or more strain-sensitive elements are provided.

Preferably in each alternative embodiment of the present invention, the stylus module will be kinematically retained on the retaining module, thus providing high positional repeatability of the stylus module. The magnetic connection between modules provides additional crash protection.

BRIEF DESCRIPTION OF THE DRAWINGS

Embodiments of the invention will now be described, by way of example, and with reference to the accompanying drawings in which.

Figure 1:
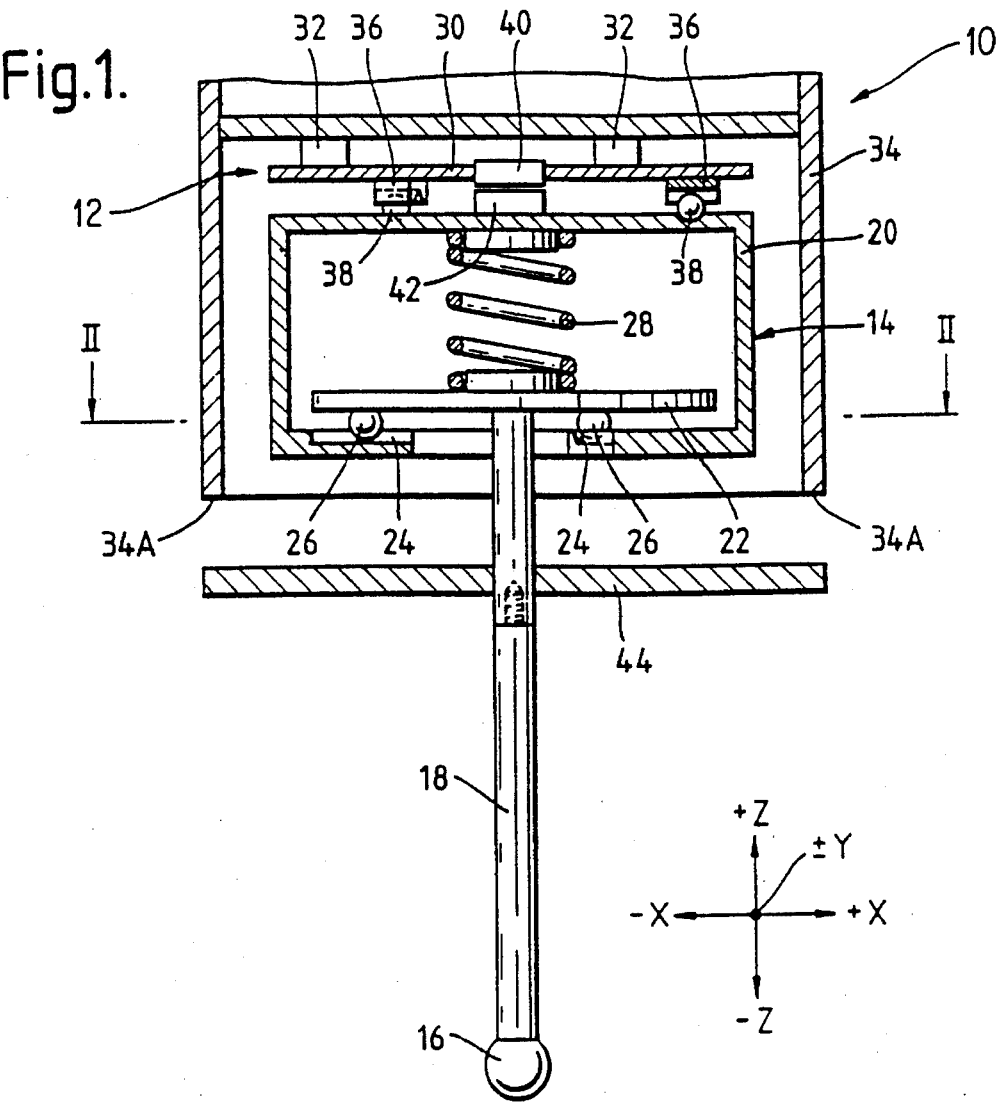
FIG. 1 is a vertical cross-section through a first embodiment of probe according to the present invention.

Referring firstly to FIG. 1, a probe 10 can be attached to the movable arm of a coordinate positioning machine such as a coordinate measuring machine or machine tool, which can then move the probe relative to a workpiece to be measured. The probe 10 comprises a retaining module 12, and a stylus module 14; the stylus module 14 provides for the necessary overtravel when the stylus 18 is deflected by such contact in any horizontal direction, ±X, ±Y, and in the vertical direction ±Z.

The stylus module 14 comprises a support structure 20, within which a movable stylus supporting member 22 is located in a rest position on a kinetic mount. A kinematic mount provides a very precisely defined rest position, as is well known. Various forms of kinematic mount are known in the art, and may be used. For example, some form are described in U.S. Pat. No. 4,153,998 and in "Bauelemente der Physikalischen Technik" by Pollermann, Chapter 4. In general a kinematic mount between two bodies is formed by engagement of two sets of elements, one set on each body. It is generally possible, given one set of engagement elements suitable for forming a kinematic support, to determine the form of a corresponding set of elements required to provide a kinematic mount when the two sets of elements come into engagement.

Figure 2:
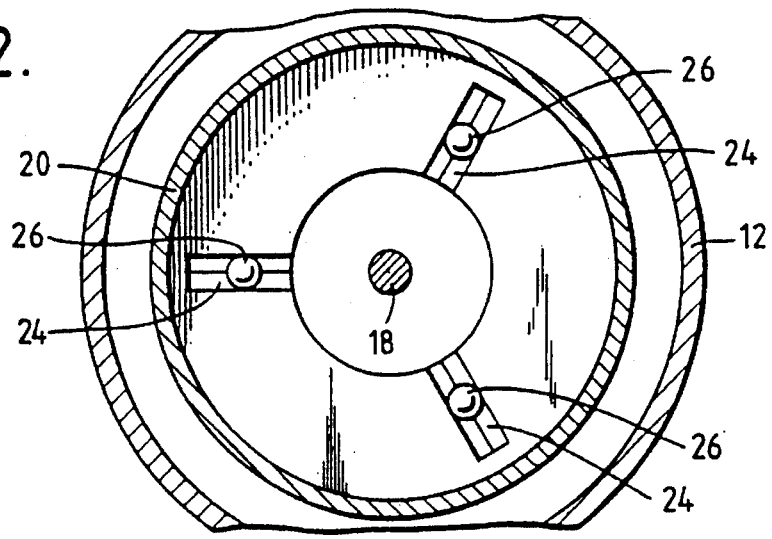
FIG. 2 is a horizontal cross-section on the line II—II in FIG. 1.

In the present embodiment, as seen in FIGS. 1 and 2, the kinematic mount comprises a first set of engagement elements provided by three radially-extending V-grooves 24 in the support structure 20 of the stylus module 14. These grooves are open in the upwards direction, and are spaced at 120° apart from each other around the vertical axis of the probe. The underside of the stylus-supporting member 22 has a second set of engagement elements provided by three corresponding balls 26 affixed thereto. The balls 26 are biased into their respective V-grooves 24 by a compression spring 28 acting between the stylus-supporting member 22 and the support structure 20. The biasing force exerted by the compression spring 28 is chosen with regard to the length and/or configuration of the stylus.

In normal use of the probe, when the stylus tip 16 contacts the workpiece in any horizontal direction, the stylus 18 and the stylus-supporting member 22 tilt about at least one of the balls 26, and one or two of the other balls disengage from their respective V-grooves 24. This provides for the necessary overtravel of the probe without causing damage in normal circumstances. Likewise, the stylus 18 and the stylus-supporting member 22 can be deflected bodily upwards (in the +Z direction) when the probe is brought vertically downwards onto a workpiece. In this case, all the balls 26 disengage from their respective V-grooves 24. When the probe is again moved so that the stylus no longer contacts the workpiece, the stylus-supporting member 22 is returned to its original precisely defined rest position relative to the support structure 20 under the action of the bias provided by the spring 28.

The stylus module 14 is retained on a load cell, here provided by a plate, board or wafer 30 within the retaining module 12, which contains appropriately sensitive sensors and which may also if desired carry electronic circuits associated with the sensors, e.g. to develop a trigger signal each time the sensing tip 16 of the stylus 18 contacts a workpiece. Suitably, the sensors are sensitive to minute strains or deformations. Such strains typically result from deformation of the stylus 18 which occurs upon contact of the stylus with a workpiece, and prior to any displacement of the stylus-supporting member 22 from its rest position. These strains are transmitted through the support structure 20 of the stylus module 14 and to the plate or board 30 whenever such contact occurs; the trigger signal is generated whenever the outputs of such strain sensors exceed a predetermined trigger threshold. The sensors may for example be strain gauges mounted on the plate 30, or on pillars 32 by which the plate 30 is mounted to the fixed structure of the retaining module (provided by the housing 34) as described in U.S. Pat. No. 4,813,151. Alternatively, the board or wafer 30 may be a hybrid integrated circuit, including semiconductor strain gauge elements and the associated electronic circuits. Such a hybrid integrated circuit may be fabricated using thick film technology.

The mounting between the stylus module 14 and the plate, board or wafer 30 takes the form of a further kinematic mount. Again, any of the well known forms of kinematic mount may be used, but in the example shown here three radially-extending V-grooves 36 are provided on the underside of the board 30, spaced at 120° intervals around the axis of the probe. Balls 38 are fixed to the upper side of the stylus module support structure 20 and locate in respective ones of the V-grooves 36. This ensures that the stylus module 14 has a precisely defined rest position relative to the retaining module 12, and together with the kinematic mount of the stylus-supporting member 22 relative to the stylus module 14, the precisely defined rest position of the stylus 18 relative to the retaining module 12, and thus the movable arm of the machine is assured. This obviates the need to re-datum the probe each time one stylus module is exchanged for another. The balls 38 are biased into the V-grooves 36 by means of a permanent magnet 40 provided on the plate 30, which attracts a soft iron striker plate 42 on the upper surface of the stylus module 14 thereby retaining the stylus module 14 on the retaining module 12, while enabling easy interchange of one stylus module 14 for another. However, it will be appreciated that other releasable retaining means may be provided, e.g. such as those disclosed in case W085/02138 or U.S. Pat. No. 4,349,946.

The stylus-supporting member 22 is provided with a horizontally extending flange 44. When the stylus 18 is in its rest position, this flange 44 is located under a bottom annular edge 34A of the housing 34, spaced apart from the edge 34A by a gap. This gap is of sufficient size so that the flange 44 does not interfere with the normal operation of the probe described above. However, the flange 44 is useful should a collision accidentally arise in which the movement of the movable arm of the machine is not braked when the stylus 18 hits a workpiece as the probe travels towards that workpiece, e.g. because of faulty programming of a computer which controls the movement of the machine. In such a collision, the flange 44 acts to protect the fragile plate, board or wafer 30 and the sensitive components located on it.

Where such a collision occurs while the probe is travelling horizontally, at first the stylus-supporting member 22 tilts as described above. During this normal tilting, the spring 28 gives way and limits the loading on the plate 30. When the tilting becomes excessive, the flange 44 touches the bottom edge 34A of the housing 34 at one point, and loading then occurs directly between the flange 44 and the housing 34. As the probe overtravels further, the entire stylus module 14 starts to tilt about one or two of the balls 38, and the other ball or balls 38 disengage from their respective V-grooves 36. As such excessive tilting continues, the striker plate 42 moves away from the magnet 40, so that the magnet 40 is no longer able to hold the stylus module 14 in place. The stylus module 14 and the attached stylus 18 then simply fall out of the housing 34, and damage to the fragile (and expensive) board or plate 30 is avoided.

If the collision with the workpiece occurs vertically, in the +Z direction, then as described above the stylus-supporting member 20 lifts bodily within the stylus module 14. Again, the stress on the board or plate 30 is limited by the spring 28. When the overtravel becomes excessive, the flange 44 again contacts the bottom edge 34A of the housing 34. In this case, tilting of the stylus module 14 is not possible but nevertheless all the loading is taken between the flange 44 and the housing 34, and excessive loading of the plate 30 is avoided. Inevitably, the stylus 18 will be damaged, but this is a cheap, and easily replaceable item when compared with the board 30.

Figure 3A:
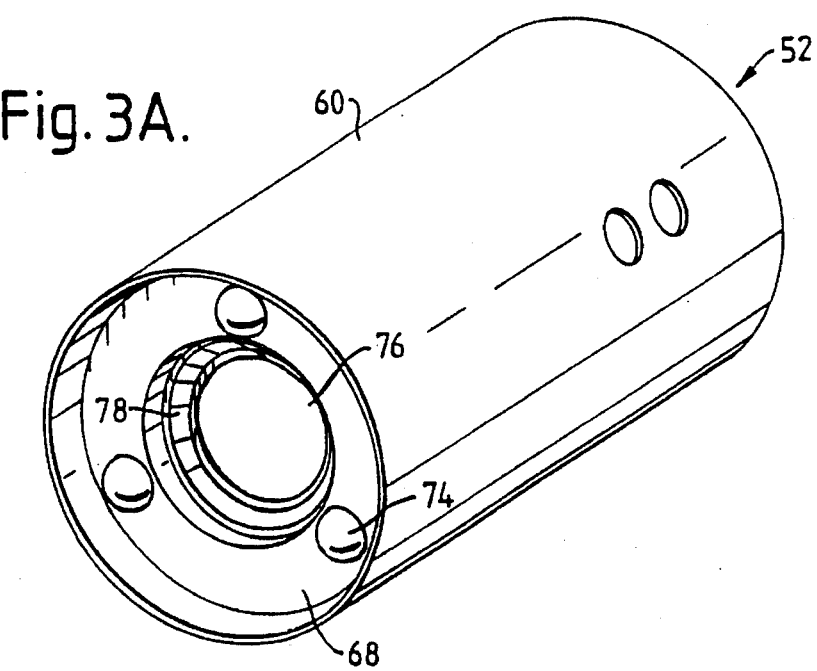
FIGS. 3A and 3B show perspective views of a retaining module and stylus module according to a second embodiment of the present invention.
Figure 3B:
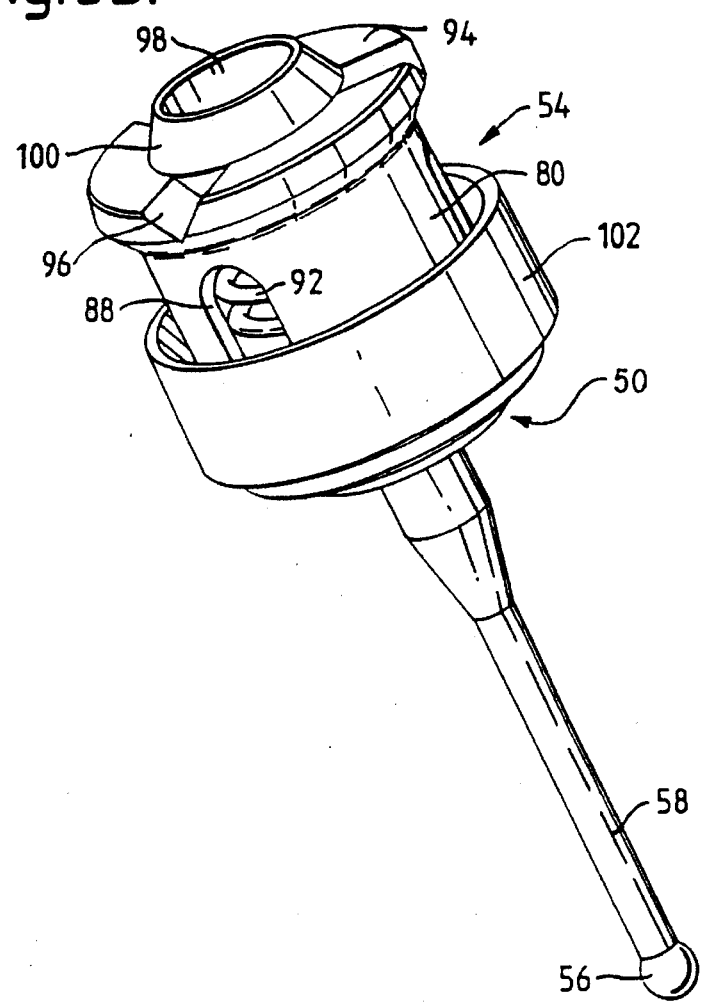
Figure 4:
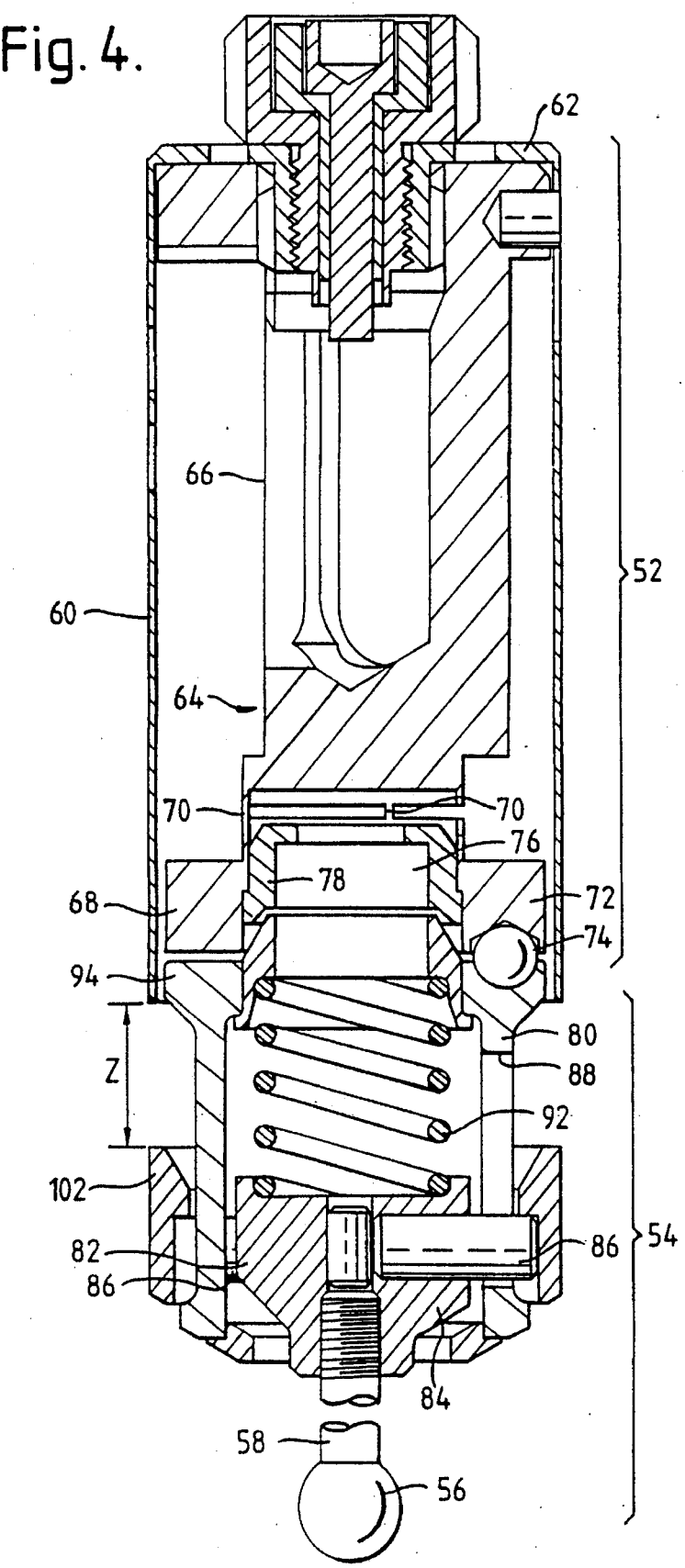
FIG. 4 shows a vertical cross-section through the retaining module and stylus module of FIGS. 3A and 3B.
Figure 5:
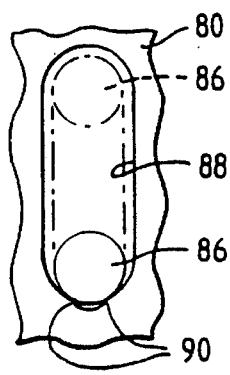
FIG. 5 shows a detail of FIGS. 3B and FIG. 4.

Referring now to FIGS. 3 to 5, a second embodiment of a probe 50 comprises a retaining module 52 on which a stylus module 54 is magnetically and releasably retained. The retaining module 52 determines contact between the sensing tip 56 of a stylus 58 and a surface, and the stylus module 54 provides overtravel of the stylus 58 relative to the retaining module to prevent collision damage.

The retaining module 52 comprises a fixed structure provided by a cylindrical housing 60 having an end wall 62 on which a screw-threaded boss 63 is provided, by which the probe 50 may be connected to the movable arm of a coordinate positioning machine. A load cell 64 is supported on the end wall 62 and comprises two portions: a cage 66 of triangular cross-section which is used to support processing electronics for the retaining module and an annular retaining ring 68 upon which the stylus module 54 is supported. The cage 66 and retaining ring 68 are interconnected by an arc of relative weakness provided by three pillars 70. A semiconductor strain gauge (not shown) is supported on each of the pillars 70 to sense strain in the pillar 70 transmitted through the stylus module 54 as a result of contact between the sensing tip 56 of the stylus 58 and the surface of a part to be inspected. The pillars should be sufficiently stiff to avoid hysteresis, and sufficiently yieldable to allow detectable strain to occur in them. When the strain in the strain gauge exceeds a predetermined threshold the signal processing electronics of the retaining module 52 emit a trigger signal which is sent to the machine control in the usual manner. The strain gauges and processing electronics are described more fully in U.S. Pat. Nos. 4,813,151 and 4,817,362 and will not be described further here.

The annular retaining ring 68 comprises an outer ring 72 which carries three equi-spaced balls 74, and a magnet 76 retained inside the outer ring 72 by an inner ring 78.

The stylus module 54 comprises support structure provided by a substantially cylindrical casing 80 whose axis is coaxial with the axis of the stylus 58, and which supports a movable stylus-supporting member 82 in a kinematic rest position. The stylus-supporting member 82 comprises a central body 84 carrying three rollers 86 which extend radially with respect to the cylindrical casing 80. Each of the rollers 86 projects through a longitudinally extending slot 88 provided in the wall of the casing 80 and rests against a pair of shoulders 90 provided at the base of each of the slots 88 (see FIG. 5). The stylus-supporting member 82 is biased into the kinematic rest position (in which each of the rollers 86 rests against a pair of shoulders 90) by a spring 92, and the force on the stylus-supporting member 82 is chosen to be commensurate with the restoring force required to return the supporting member to its kinematic rest position having regard to the length and configuration of the stylus 58. The casing 80 terminates at its upper end in a circular flange 94 having three radially extending v-grooves 96 provided in its upper surface. A magnet 98 supported by a collar 100 co-operates with the magnet 76 provided on the retaining module 52 to retain the stylus module 54 thereon. The stylus module 54 is kinematically retained on the retaining module 52 by seating of each of the balls 74 in the convergent surfaces provided by a v-groove 96. The kinetic support between the stylus module 54 and the retaining module 52 ensure high positional repeatability for the sensing tip 56 of the stylus 58 of a given stylus module 54 relative to the retaining module 52 (and therefore relative to the movable arm of the machine on which the probe 50 is supported) over a large number of interchange operations of the particular stylus module 54.

A deflecting force on the sensing tip 56 of the stylus 58 (due to the probe 50 being driven by the machine so that the sensing tip 56 contacts a surface) will initially cause the stylus 58 to deform slightly, prior to any movement of the stylus-supporting member 82 from the rest position. This deformation (or strain) in the stylus 58 is transmitted through the casing 80 of the stylus module to the strain-sensitive load cell, causing strain in the pillars 70 and the associated =train gauges, which in turn causes the associated electronic circuitry to emit a trigger signal (indicating stylus-workpiece contact) at a predetermined level of strain. As the deflecting force increases due to the movable arm of the machine "overtravelling" the point of contact between the stylus 54 and the surface, the stylus-supporting member 82 will be displaced from its rest position against the action of spring 92. One or more of the rollers 86 will thus lift off the shoulders 90 and move upwards in the slots 88.

It is not essential for the strain-sensitive load cell to include strain gauges. Other strain sensitive sensors, such as capacitive sensors (e.g. piezoelectric elements), or optical strain sensitive elements such as birefringent elements may be used. In these alternative arrangements the area of weakness which, for example, interconnects the two parts of the load cell, should have a stiffness chosen in accordance with the sensitivity of the sensitive elements employed. When the elements are sufficiently stiff (e.g. piezoelectric elements) the area of weakness may be provided by the elements themselves.

Potential damage to the pillars 70 (and strain gauges supported thereon) due to excessive upward deflection of supporting member 82 is avoided by providing a skirt 102 supported on the end of the rollers 86, which extends around the casing 80. Upward movement of the stylus 58 (and thus the supporting member 82 and skirt 102) by an amount greater than the distance Z indicated in FIG. 4, will result in the skirt 102 coming into contact with the housing 60. While this is obviously undesirable, it represents an important safety feature in that excessive upward movement of the stylus 58 will not damage delicate sensors of the retaining module 52; excessive movement of the stylus 58 in either of the two directions (X or Y) perpendicular to the Z direction wall simply result in the stylus module 54 becoming disconnected from the retaining module 52 because the magnetic force between the magnets 76 and 98 has been exceeded by the lateral force on the stylus 58.

Figure 6:
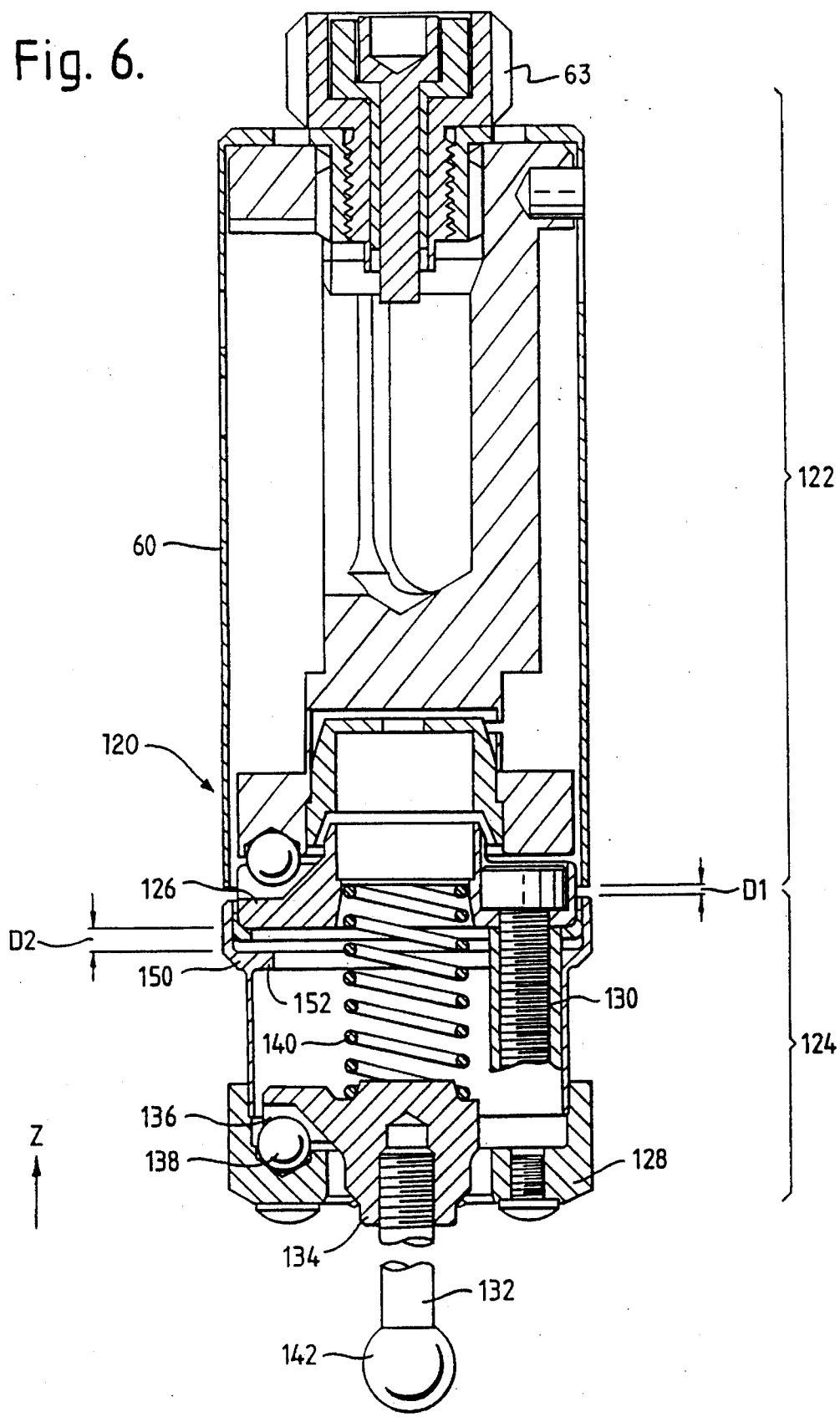
FIG. 6 shows a vertical cross-section through a third embodiment of probe according to the present invention.

A third embodiment of the probe according to the present invention provides an alternative form of stylus module for use with the retaining module 52 of FIGS. 3A and 4. Referring now to FIG. 6, a probe 120 comprises a retaining module 122 and a stylus module 124. The retaining module 122 is identical to the retaining module of FIGS. 3A and 4 and will not be described further.

The stylus module 124 has a supporting structure provided by an upper casing 126 and a lower casing 128; the upper 126 and lower 128 casings being interconnected by three bolts 130, which extend axially with respect to the stylus 132 Of the retaining module 124. A movable stylus-supporting member 134, having three rollers 136 which extend radially with respect to the stylus 132, is kinematically supported on the lower casing 128 by seating of each of the rollers 136 in the convergent surfaces defined by an adjacently positioned pair of balls 138 supported in the lower casing 128. A spring 140, acting between the upper and lower casings 126, 128 of the stylus module 124 urges the stylus-supporting member 134 into its kinematically defined rest position. As described with reference to FIGS. 1 to 4 above, contact between the sensing tip 142 0f the stylus 132 and a surface whose position is to be measured results-initially in a deformation of the stylus 132 which is sensed by the retaining module, and subsequently in a deflection of the stylus-supporting member 134 from its kinematic rest position.

A floating annular skirt 150 is provided between the upper 126 and lower 128 casings of the stylus module 124. The distal end of the skirt 150 with respect to the housing 60 of the retaining module is received inside the lower casing 128, and has a smaller diameter than the casing 128. The proximal end of the skirt 150 has a diameter corresponding to that of the housing 60, and confronts the housing 60. An inwardly depending annular flange 152 provides an abutment for the stylus-supporting member 134 when deflection of the supporting member 134, in a direction indicated in the Figure as the Z direction, exceeds a predetermined threshold. The dimensions of the skirt 150 are chosen such that the distance D1 between the proximal end of the skirt and the housing 60 is smaller than the distance D2 between the flange 152 and the upper casing 126 of the stylus module 122. Thus, if the stylus-supporting member 134 is excessively displaced in the Z direction the member 134 will first abut the flange 152, whereupon both the supporting member 134 and the shirt 150 will move together. However, because the distance D1 is smaller than the distance D2, the supporting member 134 and skirt 150 will come into contact with the housing 60 before any force is exerted on the upper casing 126 of the retaining module 122 (and thus the load cell 64 of the retaining module 122). This arrangement protects the sensitive pillars 70 and semi-conductor strain gauges provided thereon. Because the skirt 150 is displaceable through only a limited range of movement, and only in a single direction, the skirt 150 provides a good degree of sealing of the stylus module 124 from the ingress of dust or other contaminants which may prevent accurate re-seating of the stylus-supporting member 134 in the kinematic rest position.

Figure 7:
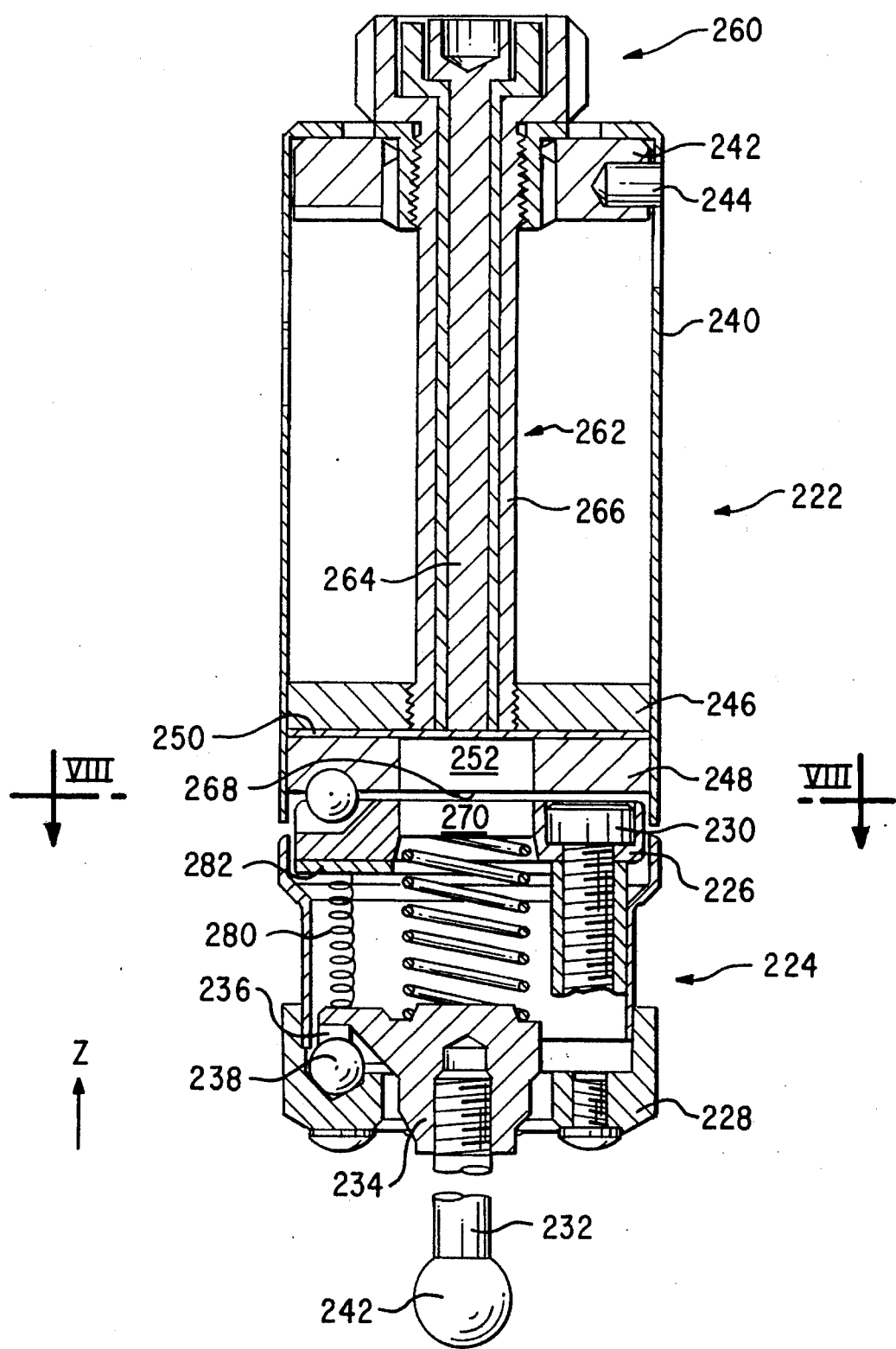
FIG. 7 shows a vertical cross-section through a fourth embodiment of probe according to the present invention.
Figure 8:
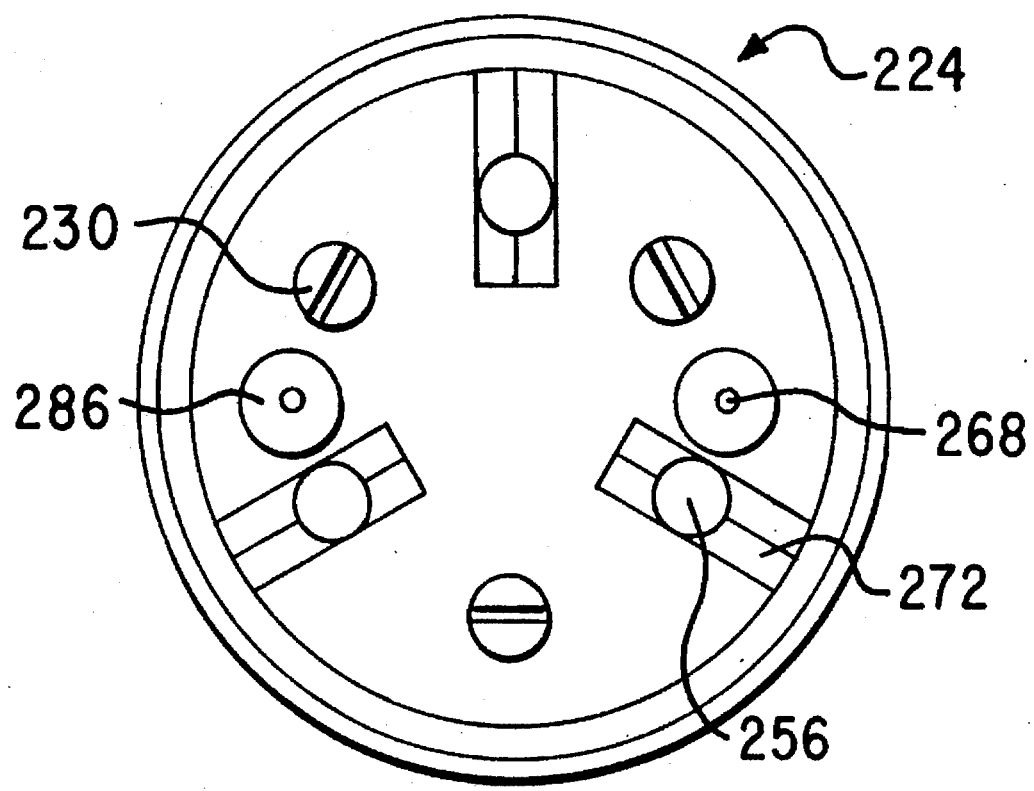
FIG. 8 is a section on VIII—VIII in FIG. 7.

A fourth embodiment of probe will now be described with reference to FIGS. 7 and 8. A probe includes a retaining module 222 on which a stylus module 224 is releasably retainable. The retaining module 222 includes a housing 240, having a retaining bush 242, of plastics material, retained in the housing at one end by a grub screw 244. The other end of the housing 240 is closed by means of a pair of ceramic inserts 246, 248, separated by a printed circuit board 250. The insert 248 retains a permanent magnet 252, together with three equispaced balls 256, which, as with previous embodiments, form one part of a kinematic location for the stylus module 224 on the retaining module 222. The probe is retained on the movable arm of a coordinate positioning machine by means of a screw-threaded boss 260, provided on one end of a coaxial connecting rod 262, having a screw-threaded engagement with the plastic retaining bush 242. The end of the connecting rod 262 distal to the boss 260 screw-threadly engages ceramic insert 246 and abuts the printed circuit board 250. The circuit board 250 makes individual electrical connections between the inner and outer and electrodes 264, 266 of connecting rod 262 and a pair of axially extending spring-loaded electrical connecting pins 268.

The stylus module 224 comprises, as previously, upper and lower casings 226, 228, secured to each other by means of three axial extending bolts 230; a permanent magnet 270, which cooperates with magnet 252 to kinematically retain the stylus module 224 on the retaining module 222 by means of engagement between three radially extending v-grooves 272, provided on the upper casing 226, with the three balls 256; and a stylus-supporting member 234 biased into a kinematic rest position with respect to the lower casing 228, provided by three pairs of balls 238 and three radially extending rollers 236. In addition however, the stylus module 224 further comprises six electrically conducting helical springs 280, extending between each of the balls 238, and an annular printed circuit board 282, provided on the upper casing 226. The springs 280 and printed circuit board 282 cooperate to create a series electrical circuit which incorporates each of the contact points between a ball 238 and a roller 23. The circuit board 282 provided connection of the electrical circuit to a pair of terminals 286, provided on the top face of the upper casing 226. When the stylus module 224 is engaged with the retaining module 222, each of the electrical terminals 286 contacts a spring loaded pin 268, thus enabling electrical connection of the electrical circuit which incorporates the balls 238 and rollers 236 to suitable processing circuitry provided e.g. on route to the machine control (via rod 262).

Contact between the sensing tip 242 of the stylus 232 and a workpiece may be detected by measuring small-scale changes in the resistance of the electrical circuit, as disclosed in U.S. Pat. No. 4,153,998.

The probe embodiments described above may be employed on a machine to provide a flexible measuring system by virtue of the ability to change styli. To this end, a rack containing a plurality of stylus modules, each having a stylus configuration suitable for a particular measuring operation and a biasing force appropriate for the stylus configuration concerned, may be provided on the machine. An example of such a rack is shown in U.S. Pat. No. 4,688,307.

We claim:

1. A touch probe for a coordinate positioning maching, having an elongate stylus, and means for detecting contact of said stylus with an object, wherein said probe includes a retaining module and a stylus module which is releasably and repeatably retainable on the retaining module, thereby to enable the exchange of one configuration of stylus for another, and thus the inspection of differently oriented surfaces of a part under inspection, wherein:

said retaining module comprises:

a fixed structure;

means for enabling rigid connection of the fixed structure to a movable arm of the machine;

a first set of engagement elements provided on the fixed structure for receiving the stylus module; and a first ferromagnetic element connected to said fixed structure, and said stylus module comprises:

a supporting structure, having a second set of engagement elements provided thereon, engageable with said first set of engagement elements, thereby to enable repeatable location of said stylus module on said retaining module;

a second ferromagnetic element, provided on said supporting structure, for cooperating with said first ferromagnetic element to releasably retain said stylus module on said retaining module; and a movable stylus supporting member for carrying said stylus, the movable stylus supporting member being supported relative to the supporting structure in a rest position, from which said movable stylus supporting member may be displaced when a deflecting force is applied to the stylus, and to which said movable stylus supporting member may return when said force is removed; and biasing means for biasing the movable stylus supporting member into the rest position, said biasing means acting between said supporting structure and said movable stylus supporting member.

2. A touch probe according to claim 1 wherein said means for detecting contact is provided within said retaining module.

3. A touch probe according to claim 2 wherein said means for detecting comprises means for sensing strain, resulting from deformation of the stylus, and transmitted from said stylus to said retaining module via the supporting structure of the stylus module.

4. A touch probe according to claim 1 wherein a plurality of first locating elements are provided on said movable member, and a plurality of second locating elements are provided upon said supporting structure, said first and second locating elements cooperating to provide a kinematic location of said movable member relative to said supporting structure.

5. A touch probe according to claim 4 wherein said means for detecting contact comprises an electrical circuit incorporating points of contact between said first and second locating elements.

* * * * *